US009428276B1

(12) United States Patent
Marini et al.

(10) Patent No.: US 9,428,276 B1
(45) Date of Patent: Aug. 30, 2016

(54) SWIVEL MECHANISM FOR VEHICLE SEAT

(71) Applicant: PAC SEATING SYSTEMS, INC., Palm City, FL (US)

(72) Inventors: Hector Noel Marini, Palm City, FL (US); Michael Boyle, Palm City, FL (US)

(73) Assignee: PAC SEATING SYSTEMS, INC., Palm City, FL (US)

( * ) Notice: Subject to any disclaimer, the term of this patent is extended or adjusted under 35 U.S.C. 154(b) by 0 days.

(21) Appl. No.: 14/626,283

(22) Filed: Feb. 19, 2015

(51) Int. Cl.
*B60N 2/14* (2006.01)
*B64D 11/06* (2006.01)

(52) U.S. Cl.
CPC ....... *B64D 11/0648* (2014.12); *B64D 11/0643* (2014.12); *B64D 11/0696* (2013.01)

(58) Field of Classification Search
CPC ........ B60N 2/06; B60N 2/14; B60N 2/2869; B60N 2/3034; B60N 2/3068; B64D 11/0648; B64D 11/0643; B64D 11/0696
See application file for complete search history.

(56) References Cited

U.S. PATENT DOCUMENTS 1,803,063 A 4/1931 Hultgren
2,201,839 A 5/1940 Van Hoesen
2,290,464 A * 7/1942 Buchheit .................. B60N 2/04 248/425
2,822,858 A 2/1958 Mussler
2,992,852 A 7/1961 Loofbourrow et al.
3,066,979 A 12/1962 Pitts et al.
3,113,804 A 12/1963 Ritter
4,014,507 A 3/1977 Swenson
4,561,621 A 12/1985 Hill
4,593,875 A 6/1986 Hill
4,640,486 A 2/1987 Neville
4,705,256 A 11/1987 Hofrichter
4,733,903 A 3/1988 Bailey
4,792,188 A 12/1988 Kawashima
4,844,543 A 7/1989 Ochiai
4,846,529 A 7/1989 Tulley
4,945,853 A 8/1990 Lathers
5,082,328 A 1/1992 Garelick
5,127,621 A 7/1992 Uecker et al.
5,161,765 A 11/1992 Wilson
5,385,323 A 1/1995 Garelick
5,390,978 A 2/1995 Janisch
5,568,960 A 10/1996 Oleson et al.
5,599,065 A 2/1997 Gryp et al.
5,651,576 A * 7/1997 Wallace ................. A47K 3/001 248/425
5,762,617 A 6/1998 Infanti
5,882,076 A 3/1999 Garelick et al.
5,884,887 A 3/1999 Garelick et al.
6,021,989 A 2/2000 Morita et al.
6,027,170 A 2/2000 Benz et al.
(Continued)

*Primary Examiner* — Philip Gabler
(74) *Attorney, Agent, or Firm* — Troutman Sanders LLP

(57) ABSTRACT

A vehicle passenger seat swivel mechanism connected between a seat frame and a seat base secured to a vehicle body. The swivel assembly can include a swivel axis around which the seat frame rotates and a tracking axis, approximately perpendicular to the swivel axis, along which the seat frame can translate. A guide plate can be disposed on the seat base and has a guide plate rail. A guide follower can be disposed on the seat frame having an engagement surface engaging the guide plate rail. As the seat frame swivels around the swivel axis, the guide follower is displaced along the translation axis, which causes at least the seat frame to displace in the same direction along the translation axis, to at least a first or a second clearance distance from the swivel axis, and the guide plate and the guide follower do not overlap along the swivel axis.

14 Claims, 8 Drawing Sheets

(56) References Cited

U.S. PATENT DOCUMENTS

| | | | | |
|---|---|---|---|---|
| 6,116,183 | A | 9/2000 | Crow et al. | |
| 6,325,456 | B1 | 12/2001 | Carnahan | |
| 6,332,648 | B1 | 12/2001 | Aucheron | |
| 6,402,114 | B1 | 6/2002 | Carnahan et al. | |
| 6,460,818 | B1 | 10/2002 | Garelick et al. | |
| 6,557,919 | B2 * | 5/2003 | Suga ...................... | B60N 2/062 296/65.07 |
| 6,663,057 | B2 | 12/2003 | Garelick et al. | |
| 6,691,970 | B1 | 2/2004 | Sutton, Sr. | |
| 6,877,811 | B1 | 4/2005 | Garelick | |
| 6,938,957 | B2 | 9/2005 | Beatty et al. | |
| 6,981,746 | B2 * | 1/2006 | Chung ..................... | B60N 2/14 248/425 |
| 7,013,831 | B1 | 3/2006 | Garelick | |
| 7,036,883 | B1 * | 5/2006 | Thompson ........... | B60N 2/0224 297/344.24 |
| 7,219,961 | B2 | 5/2007 | Priepke et al. | |
| 7,364,234 | B2 | 4/2008 | Begin et al. | |
| 7,422,264 | B1 * | 9/2008 | Lung ........................ | B60N 2/06 296/65.01 |
| 7,472,958 | B2 | 1/2009 | Sano et al. | |
| 7,753,444 | B2 | 7/2010 | Vallentin | |
| 8,079,641 | B2 * | 12/2011 | Lung ........................ | B60N 2/06 297/344.24 |
| 8,210,613 | B2 | 7/2012 | Adelsperger et al. | |
| 2001/0011696 | A1 | 8/2001 | Jeong | |
| 2003/0097972 | A1 | 5/2003 | Keller | |
| 2003/0173479 | A1 | 9/2003 | Garelick et al. | |
| 2004/0066074 | A1 | 4/2004 | Ovitt | |
| 2007/0246987 | A1 | 10/2007 | Sano et al. | |
| 2009/0127908 | A1 | 5/2009 | Kucharski et al. | |
| 2013/0127221 | A1 * | 5/2013 | Seibold .................... | B60N 2/06 297/344.24 |
| 2013/0161990 | A1 | 6/2013 | Oleson | |

* cited by examiner

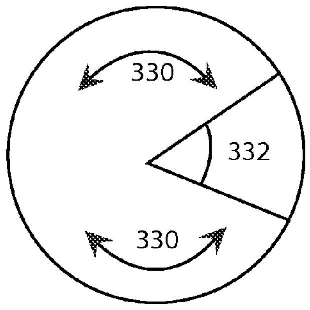
Fig. 7
Fig. 8A
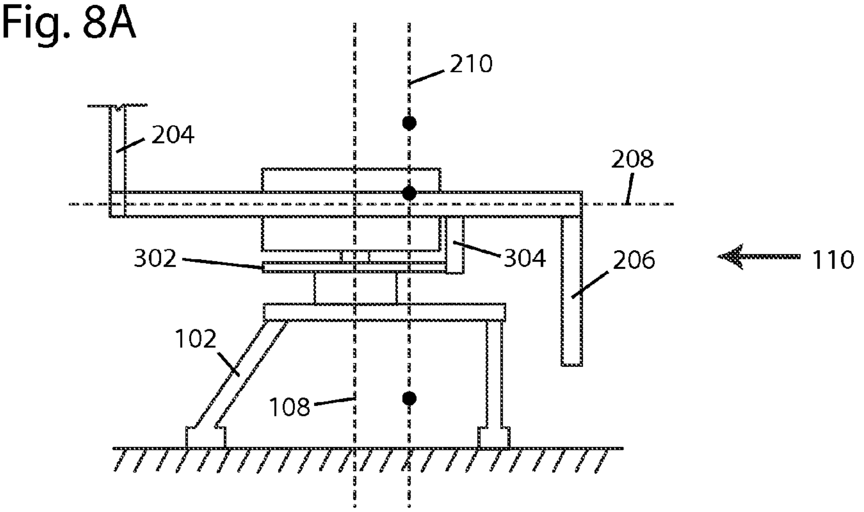
Fig. 8B
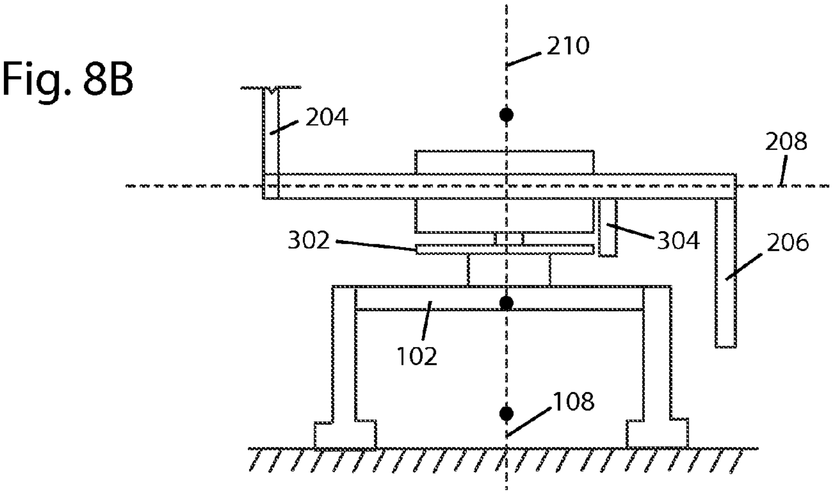

SWIVEL MECHANISM FOR VEHICLE SEAT

FIELD OF INVENTION

The present invention relates to a swivel mechanism for a seat and more particularly to a swivel mechanism for a vehicle seat, such as an aircraft seat for a business jet or another type of aircraft.

BACKGROUND

Due to the unique environment in which they are used, aircraft seat structures must meet a number of requirements. For example, such seat structures must satisfy government requirements involving aircraft safety. In addition, such seat structures must meet relatively rigid weight guidelines in order to provide satisfactory economical operation of an airplane in which they are used while, at the same time, occupying a minimum of space and still providing maximum passenger comfort and convenience.

Some of the more comfortable aircraft seats can both "track" and swivel. Tracking a seat is the ability to move a seat linearly, while swiveling allows the seat to rotate about an axis. One problem with some vehicle seats that track and swivel, especially aircraft seats, is that if they have leg rests, these often interfere with the base of the seat when seat is swiveled around. This interference typically damages the upholstery and thus aircraft operators are constantly required to perform maintenance on the seat base to keep the interior of the aircraft looking pristine.

The interference is typically caused by the large seat base size. In the aircraft industry, the seat base is sized to fit a particular aircraft and this dictates the required seat base size, regardless of the actual size of the seat itself. In the prior art, to avoid contact between the seat base and the leg rest, the seat occupant must actively track the seat away from the base as the swiveling motion is accomplished. Without this active participation from the seat occupant, the contact that occurs often damages the seat base covering or even the underlying structure.

Another approach to avoid interference between the leg rest and the seat base is to limit the longitudinal tracking of the seat. This approach maintains the leg rest at a minimum distance from the seat base at all times. The biggest disadvantage to limiting the longitudinal tracking is that it only works for small seat bases. As the required seat base grows, the tracking limitation grows as well, eventually, leading to an unacceptable motion envelope Thus, there is a need for a seat with a leg rest that can automatically track while swiveling to avoid damage to the seat base covering.

SUMMARY

Thus, it is an object of the present invention to automatically track the seat away from the base as it swivels to actively try to avoid contact with the seat base. Further, this tracking and swiveling guide should be imperceptible to the seat occupant.

Thus, examples of the invention include a vehicle passenger seat swivel mechanism connected between a seat frame upon which an individual sits and a seat base which is secured to a vehicle body. The seat frame includes a deployable legrest. The swivel assembly can include a swivel axis, around which the seat frame and the legrest rotate in relation to the seat base, and a tracking axis, approximately perpendicular to the swivel axis, along which the seat frame and the legrest can translate in relation to the seat base. Further, there can be a guide plate, disposed on the seat base and having a guide plate rail. A guide follower can be disposed on the seat frame having an engagement surface that engages the guide plate rail. As the seat frame swivels around the swivel axis, the guide follower is displaced along the translation axis, which causes at least the seat frame to displace in the same direction along the translation axis, to at least a first or a second clearance distance from the swivel axis, and the guide plate and the guide follower do not overlap along the swivel axis.

In an example, the guide plate rail has a short rail along a first side of the guide plate, and a long rail along a second side of the guide plate. The engagement surface of the guide plate alternately engages the short and long rails as the seat frame swivels around the swivel axis. Additionally, the guide plate rail can include a rounded corner transitioning between the short rail and the long rail.

A further example includes the engagement surface having a flat portion and a curved portion. When the flat portion contacts the engagement surface, the seat frame is disposed at the first clearance distance, and when the curved portion contacts the engagement surface, the seat frame is disposed at the second clearance distance.

A yet further example of the vehicle passenger seat swivel mechanism is where the guide plate rail includes a short rail along a first side of the guide plate, a long rail along a second side of the guide plate, and a rounded corner transitioning between the short rail and the long rail. Here, the engagement surface of the guide plate alternately engages the short and long rails as the seat frame swivels around the swivel axis. When the flat portion contacts the long rail, the seat frame is disposed at the first clearance distance, when the curved portion contacts the rounded corner, the seat frame is disposed at the second clearance distance, and when the flat portion contacts the short rail, the seat frame is disposed at a third clearance distance. An additional example can include that the second clearance distance is greater than or equal to the first clearance distance, and the third clearance distance is less than or equal to at least one of the first or second clearance distances.

Another example of the invention is a swivel seat for an aircraft, which includes a seat top frame, a swivel assembly, and a seat bottom frame. The top frame includes a seat frame, a seat back frame connected to the seat frame, and a legrest frame connected to the seat frame, opposite the seat back frame. The bottom frame has a seat base which is located on the bottom side of the seat base and fixes the seat bottom frame to the aircraft.

A swivel assembly is disposed between the seat top frame and the seat bottom frame, connecting the two, and permitting rotation of the seat top frame relative to the seat bottom frame. This includes a swivel axis around which the seat top frame rotates in relation to the seat bottom frame and a tracking axis, approximately perpendicular to the swivel axis, along which the seat top frame can translate in relation to the seat bottom frame. It also has a guide plate, disposed on the seat base, with a guide plate rail and a guide follower, disposed on the seat frame, having an engagement surface engaging the guide plate rail. As the seat top frame swivels around the swivel axis, the guide follower is displaced along the translation axis, which causes at least the seat frame to displace in the same direction along the translation axis, to at least a first or a second clearance distance from the swivel axis. Also, the guide plate and the guide follower do not overlap along the swivel axis.

Other examples can include where the legrest frame is deployable between an extended and stored configuration and in the stored configuration, when the seat frame swivels and moves between the first and second clearance distance, the stored legrest is moved out of an interference position with the seat bottom frame. Additionally, when the seat frame is displaced during rotation, the legrest frame and the seat back frame are displaced along with the seat frame.

The swivel seat frame can have a seat center axis, which is coextensive with the swivel axis when the seat frame is not displaced. However, the seat center axis is displaced from the swivel axis when the seat frame is displaced.

Further, the engagement surface can have a flat portion having a flat portion length and a flat portion height and a curved portion having a curved portion length and a curved portion height. Thus, when the flat portion contacts the engagement surface, the seat frame is disposed at the first clearance distance. Also, when the curved portion contacts the engagement surface, the seat frame is disposed at the second clearance distance.

Alternately, the guide plate rail can include a short rail along a first side of the guide plate, a long rail along a second side of the guide plate, and a rounded corner transitioning between the short rail and the long rail. When the engagement surface of the guide plate alternately engages the short and long rails as the seat frame swivels around the swivel axis, different positions can be introduced. When the flat portion contacts the long rail, the seat frame can be disposed at the first clearance distance. Also, when the curved portion contacts the rounded corner, the seat frame can be disposed at the second clearance distance. Further, when the flat portion contacts the short rail, the seat frame can be disposed at a third clearance distance.

Other examples have a flat portion height greater than the curved portion height and a flat portion length less than the curved portion length.

BRIEF DESCRIPTION OF THE DRAWINGS

The drawing figures depict one or more implementations in accord with the present teachings, by way of example only, not by way of limitation. In the figures, like reference numerals refer to the same or similar elements.

FIG. 7 is an example of the swivel arcs of the present invention; and

FIGS. 8A and 8B are side and front views, respectively, of an example of the swivel guide with the guide follower engaging different portions of the guide plate.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

An example of the invention will be described herein below with reference to FIGS. 1-9.

Figure 1:
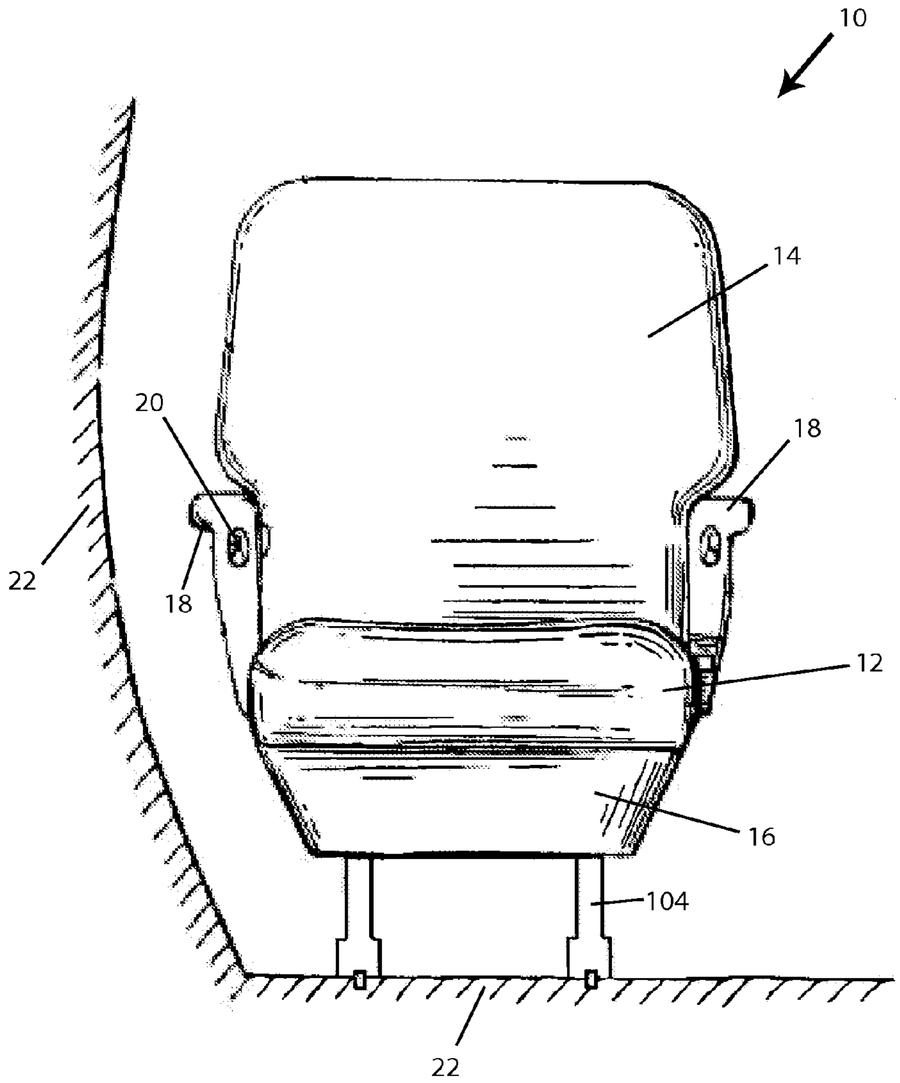
FIG. 1 is a front view of an aircraft seat of the present invention.
Figure 2:
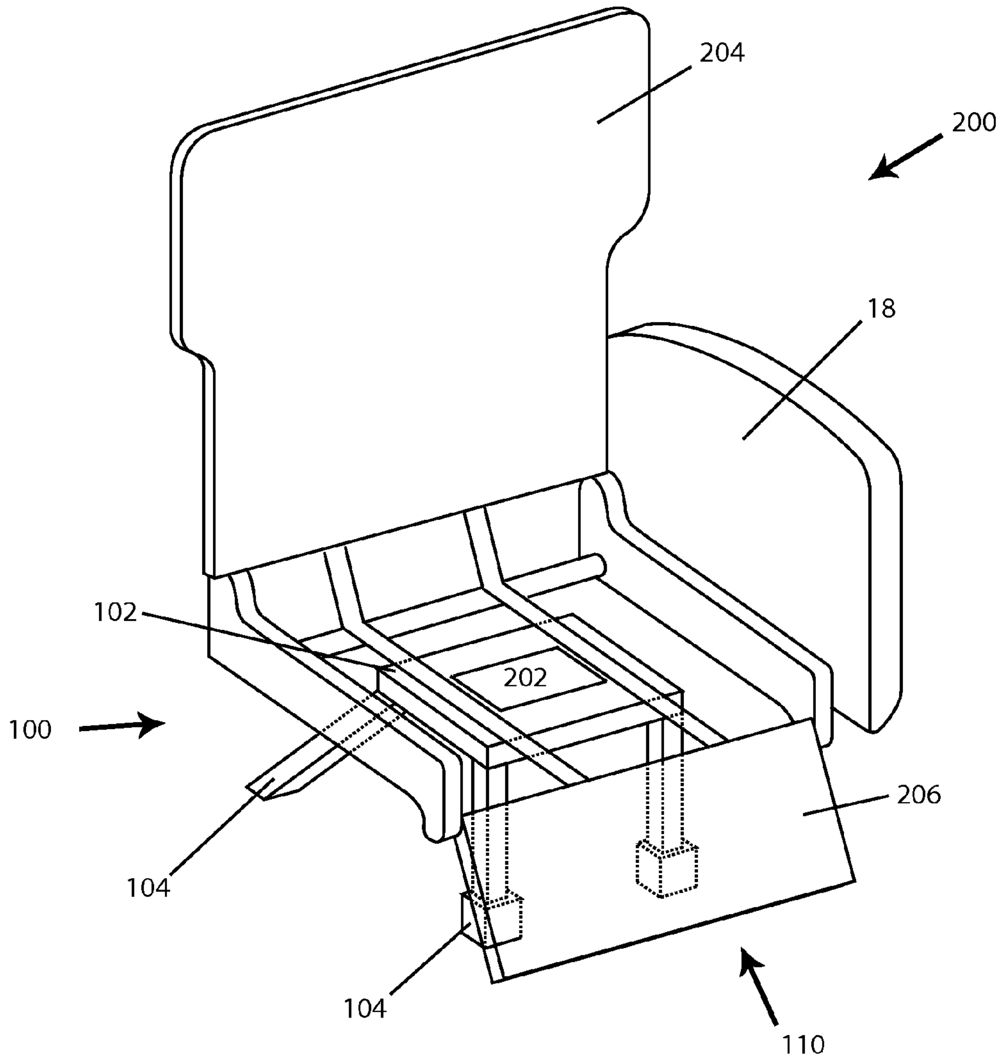
FIG. 2 is a non-upholstered, partially cut-away, top-front-right side perspective view of an aircraft seat of the present invention.
Figure 3:
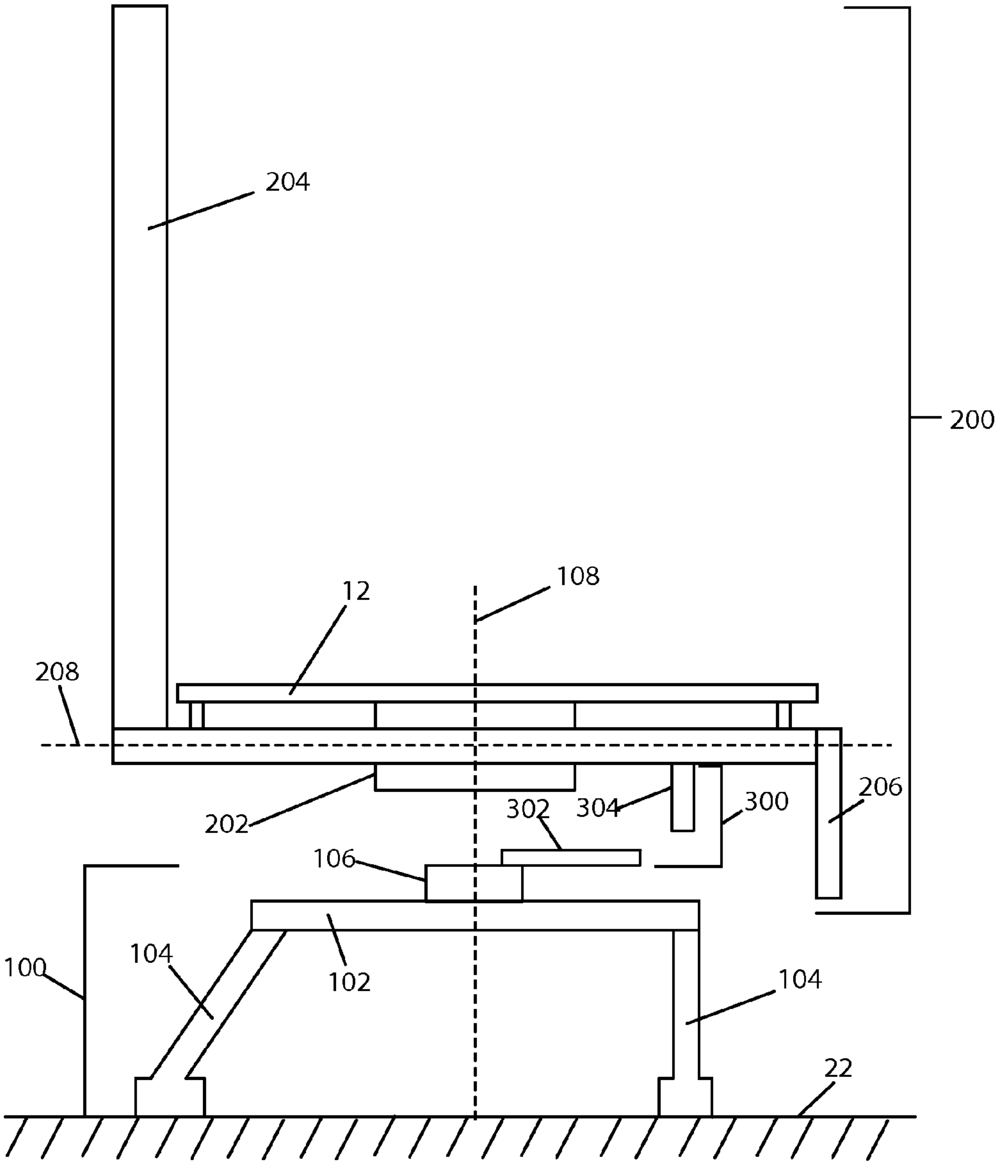
FIG. 3 is a right side, exploded cross-section of an aircraft seat of the present invention.
Figure 4A:
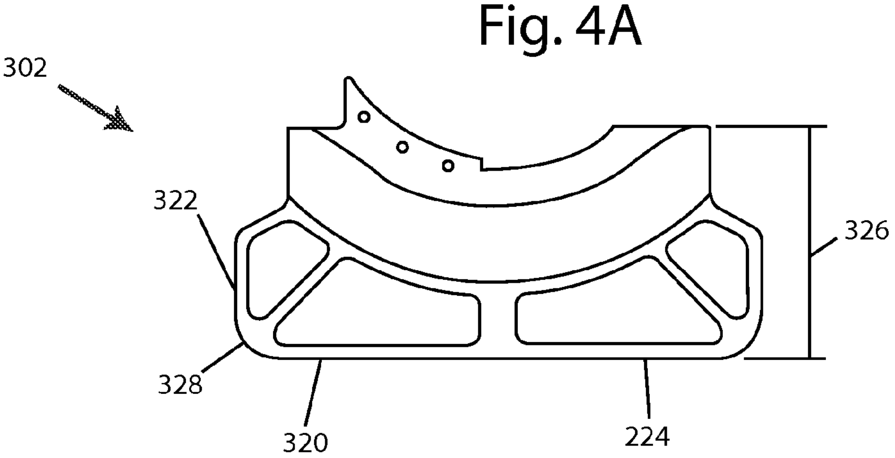
FIG. 4A is a top view of an example of a guide plate of the present invention.
Figure 4B:
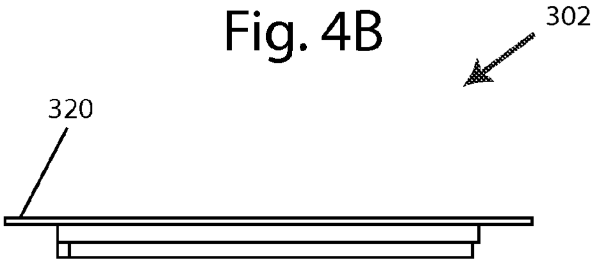
FIG. 4B is a front view of an example of a guide plate of the present invention.
Figure 4C:
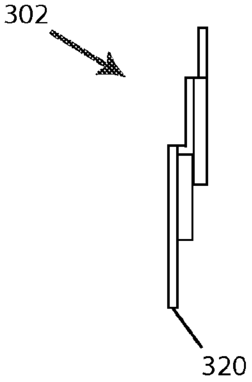
FIG. 4C is a side view of an example of a guide plate of the present invention.
Figure 4D:
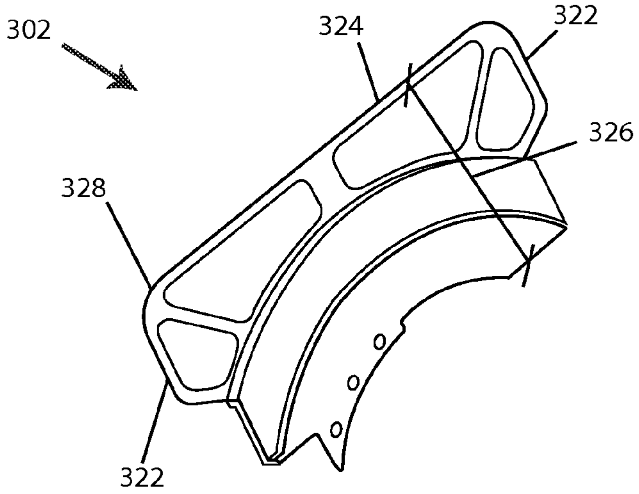
FIG. 4D is a bottom, side, perspective view of an example of a guide plate of the present invention.

FIGS. 1-3 illustrate a vehicle seat 10 that includes an upholstered seat bottom 12, an upholstered seat back 14, and an upholstered leg rest 16. The vehicle seat 10 can also be provided with a pair of armrests 18 and one or both of them can include a user operated seat reclining/pivoting/leg rest control 20. When the seat control 20 is actuated the seat back 14, leg rest 16 and/or the seat bottom 12 can be reclined, extended, tracked, or rotated.

The seat 10 has a seat bottom frame 100 which includes a seat base 102 and seat supports 104 which are fixed to the floor of a vehicle body 22. Further attached to the seat base 102 can be a swivel mechanism 106 opposite the seat supports 104. The swivel mechanism 106 has a swivel axis 108 over which it can rotate up to 360° or can be limited to any range of rotation angles. The swivel axis 108 is illustrated, and can be referred to, as a vertical axis.

Mounted to the seat bottom frame 100 can be the seat top frame 200 to complete the seat 10. The seat top frame 200 has a seat frame 202 on which can be mounted the upholstered seat bottom 12. Attached to one side of the seat frame 202 can be the seat back frame 204 and on the opposite side can be the leg rest frame 206. The seat frame 202 can track in at least two directions along a tracking axis 208. The seat 10 can be allowed to track along the tracking axis 208 within a range less than 12 inches. The tracking axis 208 is illustrated, and can be referred to, as a horizontal axis. Also note that in an example, the tracking axis 208 can "rotate" with the seat frame, so no matter where the seat frame 202 is swiveled to, the seat frame can still translate along the axis. There can also be "two" tracking axis, one for "front-back" movement and the other for "left-right/side-to-side" relative to the occupant in the seat frame 202. In one example, the seat frame 202, tracks "front-to-back" to eliminate the interferences discussed below. For orientation, the legrest frame 206 can be disposed on the "front" of the seat frame 202, and the seat back frame 204 can be disposed on the "back" of the seat frame 202.

The seat back frame 204 can be pivotally connected and can pivot down at any angle from an upright position, i.e. approximately perpendicular to the seat frame 202 (which can be also approximately perpendicular to the tracking axis 208 or approximately parallel to the swivel axis 108) to a lay flat position, i.e. approximately parallel to the seat frame 202 (which can be also approximately parallel to the tracking axis 208 or approximately perpendicular to the swivel axis 108). In addition to pivoting the seat back frame 202, a passenger can also extend the leg rest frame 206. The leg rest frame 206 can be a single piece or multiple pieces to include, leg, calf and foot supports. The leg rest frame 206 can be stowed in an approximately vertical position i.e. approximately perpendicular to the seat frame 202 (which can be also approximately perpendicular to the tracking axis 208 or approximately parallel to the swivel axis 108) but depends in the opposite direction of the seat back frame 204. Once the leg rest frame 206 is deployed, it can support a portion to the entirety of the user's legs. In the deployed position the leg rest frame 206 can be approximately parallel to the seat frame 202 (which can be also approximately parallel to the tracking axis 208 or approximately perpendicular to the swivel axis 108).

The seat frame 202, seat back frame 204, and the leg rest frame 206 can work in concert so that the entire seat 10 can enter a "sleeping configuration" in which the upholstered surfaces 12, 14, 16 are all approximately horizontal and can form an arc of approximately 180°. Note that as one or both of the seat back frame 204 and the leg rest frame 206 move, the seat frame 202 may translate. Additionally, the seat top frame 200 can rotate about the swivel axis 108 when in the fully upright position or when one or both of the seat back frame 202 is reclined and the leg rest frame 206 is deployed.

However, when the upholstered leg rest 16 is in or near the stowed position and the passenger attempts to swivel the seat 10, the leg rest frame 206 can catch portions of the upholstery covering the seat bottom frame 100. In one example of the present invention, a swivel guide 300 can be used to automatically track the seat frame 202 forward, moving the leg rest frame 206 away from the seat bottom frame 100 enough to avoid interference between the two. The swivel guide 300 can include a guide plate 302 and a guide follower 304. The guide plate and follower 302, 304 interact with each other as the seat frame 202 swivels without any requirement for passenger intervention. Thus, the seat top frame 200 can freely swivel around the swivel axis 108 without interference.

FIGS. 4A-4D illustrate an example of the guide plate 302. The guide plate 302 can be mounted to the seat base 102 or to the swivel mechanism 106 near a front 110 of the seat base. In other examples, the "front" 110 of the seat base can be defined as the position where the seat 10 is typically facing in the aircraft during takeoff and landing or arbitrarily where the leg rest frame 206 and the seat bottom frame 100 would interfere with each other. The guide plate 302 can have a rail 320 on which the follower 304 can engage. There can be two short rails 322 and a long rail 324. The short rails 322 engage the follower 304 (as discussed in more detailed below) as the seat top frame 200 begins to swivel toward the front 110 of the seat base 102. The long rail 324 is displaced a distance 326 from the swivel axis 108, so as the follower 304 engages the long rail 324, the follower 304 can be displaced forward 110 along the tracking axis 208. The displacement of the follower 304 displaces the seat frame 202 which in turn can displace the leg rest frame 206 forward 110.

Figure 5A:
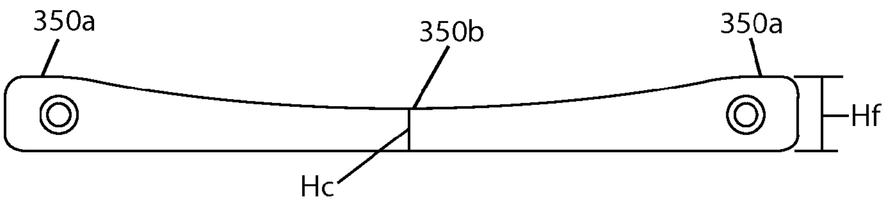
FIG. 5A is a top view of an example of a guide follower of the present invention.
Figure 5B:
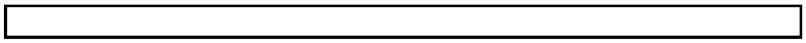
FIG. 5B is a front view of an example of a guide follower of the present invention.
Figure 5C:
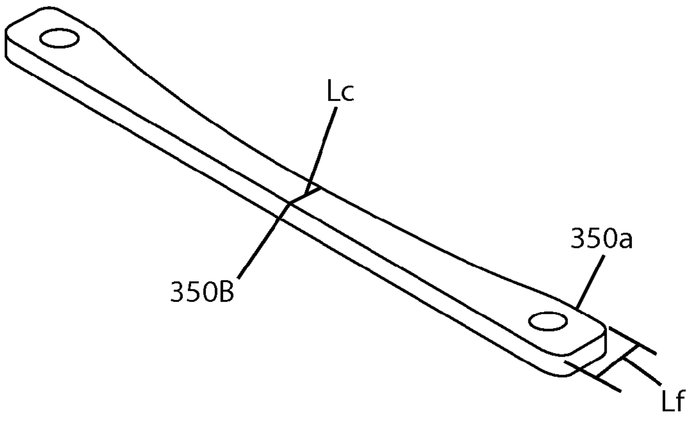
FIG. 5C is a top, front perspective view of an example of a guide follower of the present invention.

FIGS. 5A-5C illustrate an example of the guide follower 304. The guide follower 304 is mounted to the seat frame 202 between the where the seat frame 202 engages the swivel mechanism 106 and the leg rest frame 206. The follower 304 has an engagement surface 350 which engages the guide plate rail 320. The engagement surface 350 can be flat or have a radiused edge and can also take a concave or convex shape. In one example, the engagement surface 350 only engages the rail 320 on edgewise surfaces, thus their point of contact can be along the tracking axis 208. The follower 304 and the plate 302 do not overlap/contact each other along the swivel axis 108. In the illustrated example, the engagement surface 350 can have two portions, a flat portion 350*a* and a curved portion 350*b*. The flat portion 350*a* can be substantially flat as the curved portion 350*b* can be substantially curved, but may have flat spots.

The flat portion 350*a* can have a general height Hf and the curved portion 350*b* can have a height at its lowest point of Hc. In examples, Hf is greater than Hc. In a further example, a length Lf of the flat portion 350*a* is less than a length Lc of the curved portion 350*b*. Note in the illustrated example, there are two separate flat portions 350*a*, the relationship can also be that 2Lf is less than Lc.

Also note that in the illustrated examples discussed above, the guide plate 302 can be disposed on the seat base 102 and the guide follower 304 can be mounted to the seat frame 202. These mounting positions can be reversed so the follower 304 is disposed on the seat base 102 and the plate 302 can be mounted to the frame 202.

Figure 6A:
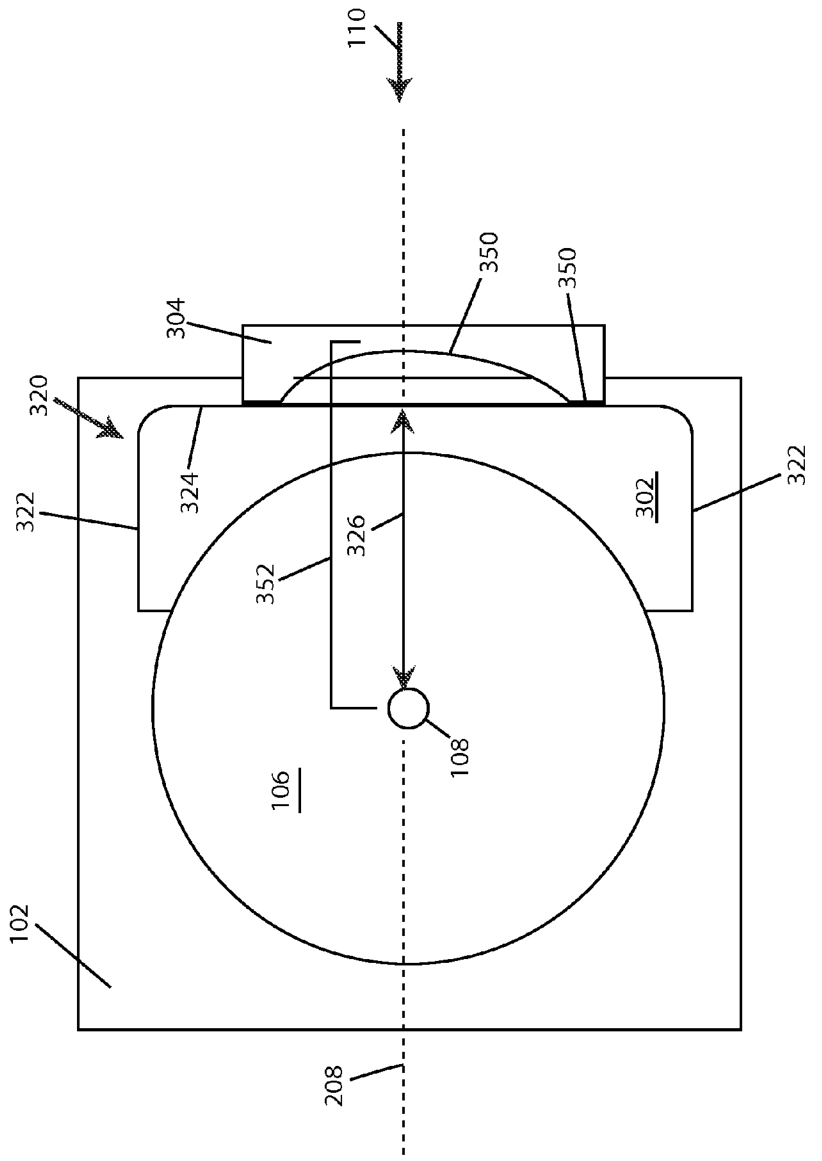
FIGS. 6A-6C are top views of an example of the swivel guide with the guide follower engaging different portions of the guide plate.
Figure 6B:
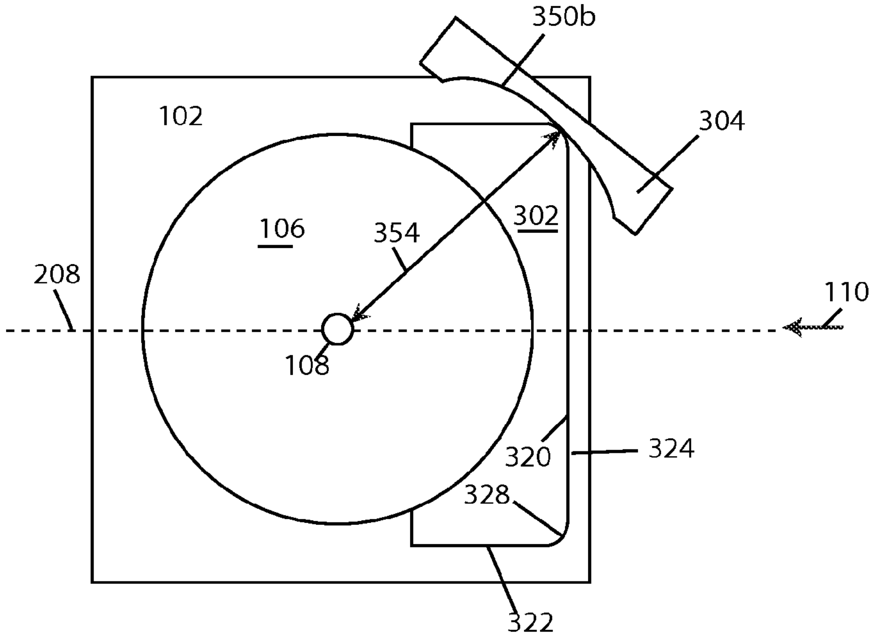
Figure 6C:
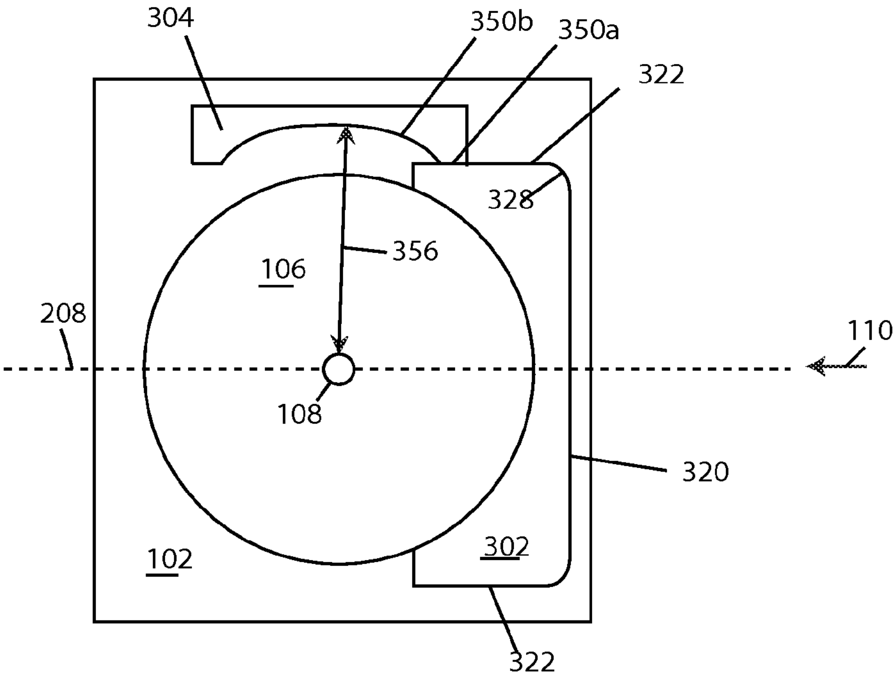

FIGS. 6A-6C illustrate the swivel guide 300 in use, and particularly in engaging the long rail 324, a curved corner 328 of the rail 320 and the short rail 322. FIGS. 6A-6C have a majority of the remaining seat elements removed for clarity. FIG. 6A illustrates a top view of the follower 304 engaging the long rail 324. Here, the follower 304 is extended a first clearance distance 352 which displaces the seat frame 202 which then tracks the leg rest frame 206 away from the seat bottom frame 100 so they do not interfere with each other. In this example, only a portion of the engagement surface 350 (350*a*) is in contact with the long rail 324. However, other examples can have a flat engagement surface 350 where a majority of surface 350 and rail 324 are in contact.

FIG. 6B illustrates the guide plate 302 and guide follower 304 engaging at the curved corner 328. Here, the follower 304 is at a second clearance distance 354 from the swivel axis 108. Given the geometry of the plate and follower 302, 304 in this example, the second clearance distance 354 can be greater than or equal to the first clearance distance 352. The engagement surface 350 (350*b*) in this illustrated example is concave and this can help smooth the transition over the curved corner 328. Since the two surfaces are curved, it allows for more surface area of the two guides 302, 304 to engage as the follower 304 rounds the corner 328. The curves of the two guides 328, 350 can complement each other in this regard.

FIG. 6C illustrates the follower 304 engaging a portion of the short rail 322. The follower 304 is at a third clearance distance 356 from the swivel axis 108. Since, in this example, the follower 304 can be longer than the short rail 322, the engagement surface 350 (350*a*) may not be in full contact with the rail 322. The third clearance distance 356 can be the less than or equal to the second or first clearance distances 352, 354. In another example, it can be the shortest of the three distances 352, 354, 356. Additionally, as the seat frame 202 continues to rotate the follower 304 rotates away from the guide plate 302 (i.e. to the left, or counter-clockwise as illustrated) until the surface 350 is no longer in contact with the rails 320. At this point, the follower 304 can maintain its third clearance distance 356 or move to a fourth clearance distance (not illustrated), which in one example is less than the third clearance distance 356.

Note that in an example, the guide plate 302 and guide follower 304 are not connected, permanently or removeably. The plate 302 and follower 302 engage along their surfaces but there are no connections or tracks which require mechanical intervention to separate the two parts.

In an illustrated example in FIG. 7, the guide plate 302 has rail 320 only over a small portion of a total travel arc 330 of the seat top frame 200. If the seat top frame 200 can swivel 360° about the swivel axis 108, then the rail 320 can cover less than 180° of the arc, and in another example, less than 90° of arc. Thus, the rail arc 332 can be less than the total travel arc 330 and, in some examples, significantly less than. Alternately, the rail arc 320 can be equal to the total travel arc 330. As noted above, the total travel arc 330 can be less than 360° depending on the configuration of the seat 10. Note that the travel arc can vary based on each individual vehicle body 22 and the placement of the seat within the vehicle body 22. That is to say, in one example, the amount each seat 10 can swivel can be based on the individual layouts of each aircraft and the placement of the seat within the aircraft.

FIGS. 8A and 8B illustrate an example of the tracking motion of the seat bottom frame 100 as it rotates with the swivel mechanism 106. FIG. 8A is a side section view where the front of the seat base 10 is on the right side of the figure and the leg rest frame 206 is at the front of the seat 10. At this position, the short rail 322 is visible on the guide plate 302 and the guide follower 304 engages the long rail 324. Note that since the view is of the side of the guide plate 302 the long rail 324 is not visible. The seat frame 202 is tracked along the tracking axis 208. This is illustrated by the seat center axis 210, which is displaced toward the front of the seat base 110 (toward the right in the figure) away from the swivel axis 108. Turning to FIG. 8B, this is a front section view of the seat 10 where the leg rest frame 206 is turned to the side of the seat 10. As illustrated in this example, the view is toward the front of the seat base 110 and the seat 10 is turned 90° to the left. The long rail 324 of the guide plate 302 is illustrated and follower 304 is not engaged with the plate 302. Thus, the leg rest frame 206 is tracked back (toward the left in the figure) along the tracking axis 208 to the seat center axis 210 and the swivel axis 108 can be coincident, in this example.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

What is claimed is:

1. A vehicle passenger seat swivel mechanism connected between a seat frame upon which an individual sits and a seat base which is secured to a vehicle body, the seat frame includes a deployable legrest; the swivel assembly comprising:

a swivel axis around which the seat frame and the legrest rotate in relation to the seat base;

a tracking axis, approximately perpendicular to the swivel axis, along which the seat frame and the legrest can translate in relation to the seat base;

a guide plate, disposed on one of the seat base and the seat frame, comprising a guide plate rail;

a guide follower, disposed on the other of the seat base and the seat frame, comprising an engagement surface engaging the guide plate rail;

wherein as the seat frame swivels around the swivel axis, one of the guide plate and the guide follower is displaced along the translation axis, which causes at least the seat frame to displace in the same direction along the translation axis, to at least a first or a second clearance distance from the swivel axis, and wherein the guide plate and the guide follower do not overlap along the swivel axis.

2. The vehicle passenger seat swivel mechanism of claim 1, wherein the guide plate rail comprises:

a short rail along a first side of the guide plate; and a long rail along a second side of the guide plate;

wherein the engagement surface of the guide plate alternately engages the short and long rails as the seat frame swivels around the swivel axis.

3. The vehicle passenger seat swivel mechanism of claim 2, wherein the guide plate rail further comprises a rounded corner transitioning between the short rail and the long rail.

4. The vehicle passenger seat swivel mechanism of claim 1, wherein the engagement surface comprises:

a flat portion; and a curved portion, wherein when the flat portion contacts the engagement surface, the seat frame is disposed at the first clearance distance, and wherein when the curved portion contacts the engagement surface, the seat frame is disposed at the second clearance distance.

5. The vehicle passenger seat swivel mechanism of claim 4, wherein the guide plate rail comprises:

a short rail along a first side of the guide plate;

a long rail along a second side of the guide plate; and a rounded corner transitioning between the short rail and the long rail;

wherein the engagement surface of the guide plate alternately engages the short and long rails as the seat frame swivels around the swivel axis, wherein when the flat portion contacts the long rail, the seat frame is disposed at the first clearance distance, wherein when the curved portion contacts the rounded corner, the seat frame is disposed at the second clearance distance, and wherein when the flat portion contacts the short rail, the seat frame is disposed at a third clearance distance.

6. The vehicle passenger seat swivel mechanism of claim 5, wherein the second clearance distance is greater than or equal to the first clearance distance, and wherein the third clearance distance is less than or equal to at least one of the first or second clearance distances.

7. A swivel seat for an aircraft, comprising:

a seat top frame, comprising:

a seat frame;

a seat back frame connected to a first end of the seat frame;

a legrest frame connected to a second end of the seat frame, opposite the first end;

a seat bottom frame, comprising:

a seat base;

a seat support depending from a bottom side of the seat base and fixing the seat bottom frame to the aircraft;

a swivel assembly disposed between the seat top frame and the seat bottom frame, connecting the two, and permitting rotation of the seat top frame relative to the seat bottom frame, comprising:

a swivel axis around which the seat top frame rotates in relation to the seat bottom frame;

a tracking axis, approximately perpendicular to the swivel axis, along which the seat top frame can translate in relation to the seat bottom frame;

a guide plate, disposed on one of the seat base and the seat frame, comprising a guide plate rail;

a guide follower, disposed on the opposite of the seat base and the seat frame, comprising an engagement surface engaging the guide plate rail;

wherein as the seat top frame swivels around the swivel axis, one of the guide plate and the guide follower is displaced along the translation axis, which causes at least the seat frame to displace in the same direction along the translation axis, to at least a first or a second clearance distance from the swivel axis, and wherein the guide plate and the guide follower do not overlap along the swivel axis.

8. The swivel seat of claim 7, wherein the legrest frame is deployable between an extended and a stored configuration;

wherein in the stored configuration, when the seat frame swivels and moves between the first and second clearance distance, the stored configuration of the legrest frame is moved out of an interference position with the seat bottom frame.

9. The swivel seat of claim 7, wherein when the seat frame is displaced during rotation, the legrest frame and the seat back frame are displaced along with the seat frame.

10. The swivel seat of claim 9, wherein the seat frame further comprises a seat center axis, wherein the seat center axis is coextensive with the swivel axis when the seat frame is not displaced, and wherein the seat center axis is displaced from the swivel axis when the seat frame is displaced.

11. The swivel seat of claim 7, wherein the engagement surface comprises:

a flat portion having a flat portion length and a flat portion height; and a curved portion having a curved portion length and a curved portion height, wherein when the flat portion contacts the engagement surface, the seat frame is disposed at the first clearance distance, and wherein when the curved portion contacts the engagement surface, the seat frame is disposed at the second clearance distance.

12. The swivel seat of claim 11, wherein the guide plate rail comprises:

a short rail along a first side of the guide plate;

a long rail along a second side of the guide plate; and a rounded corner transitioning between the short rail and the long rail;

wherein the engagement surface of the guide plate alternately engages the short and long rails as the seat frame swivels around the swivel axis, wherein when the flat portion contacts the long rail, the seat frame is disposed at the first clearance distance, wherein when the curved portion contacts the rounded corner, the seat frame is disposed at the second clearance distance, and wherein when the flat portion contacts the short rail, the seat frame is disposed at a third clearance distance.

13. The swivel seat of claim 11, wherein flat portion height is greater than the curved portion height.

14. The swivel seat of claim 11, wherein flat portion length is less than the curved portion length.

* * * * *